J. C. HORNUNG.
VALVE MECHANISM.
APPLICATION FILED OCT. 10, 1918.

1,327,675.

Patented Jan. 13, 1920.

Inventor:
John C. Hornung.
By G. L. Gragg
Atty.

UNITED STATES PATENT OFFICE.

JOHN C. HORNUNG, OF CHICAGO, ILLINOIS.

VALVE MECHANISM.

1,327,675.       Specification of Letters Patent.      Patented Jan. 13, 1920.

Application filed October 10, 1918. Serial No. 257,610.

*To all whom it may concern:*

Be it known that I, JOHN C. HORNUNG, a citizen of the United States, residing at Chicago, in the county of Cook and State of Illinois, have invented a certain new and useful Improvement in Valve Mechanism, of which the following is a full, clear, concise, and exact description.

My invention relates to mechanism employed for controlling the passage of fluid. A single mechanism constructed in accordance with the preferred embodiment of my invention for one use thereof is adapted not only to reduce the pressure of steam passing to a heating system from a suitable steam source that may be common, though not necessarily so, to a number of such heating systems, but also regulates the temperature furnished by the heating system. In order that a single mechanism may perform these two functions, I desirably construct and arrange the same so that it will maintain a uniform pressure in the heating system equipped with it until the temperature furnished by the heating system reaches a predetermined value, whereupon the supply of steam to the heating system is checked, to be resumed when the temperature drops. My invention has been advantageously embodied in valve mechanism for reducing or otherwise controlling pressure of fluid whose passage is governed thereby, but my invention is not to be thus limited.

In carrying out my invention I subject a valve or other element that controls the passage of fluid to the unbalancing effect of fluid when the passage thereof is to be checked. This unbalancing fluid is desirably a shunted portion of the same fluid which is to have its flow controlled, an arrangement that assures the presence of the unbalancing fluid at effective pressure. In the preferred arrangement the unbalancing fluid is made effective by being admitted to a control chamber in which is located the element that is to be operated upon by the unbalancing fluid. In an automatically regulated heating system the flow of the shunted fluid may be prevented or permitted or otherwise regulated by a valve that is controlled by a thermostat which is subject to the temperature that is to be regulated.

Figure 1:
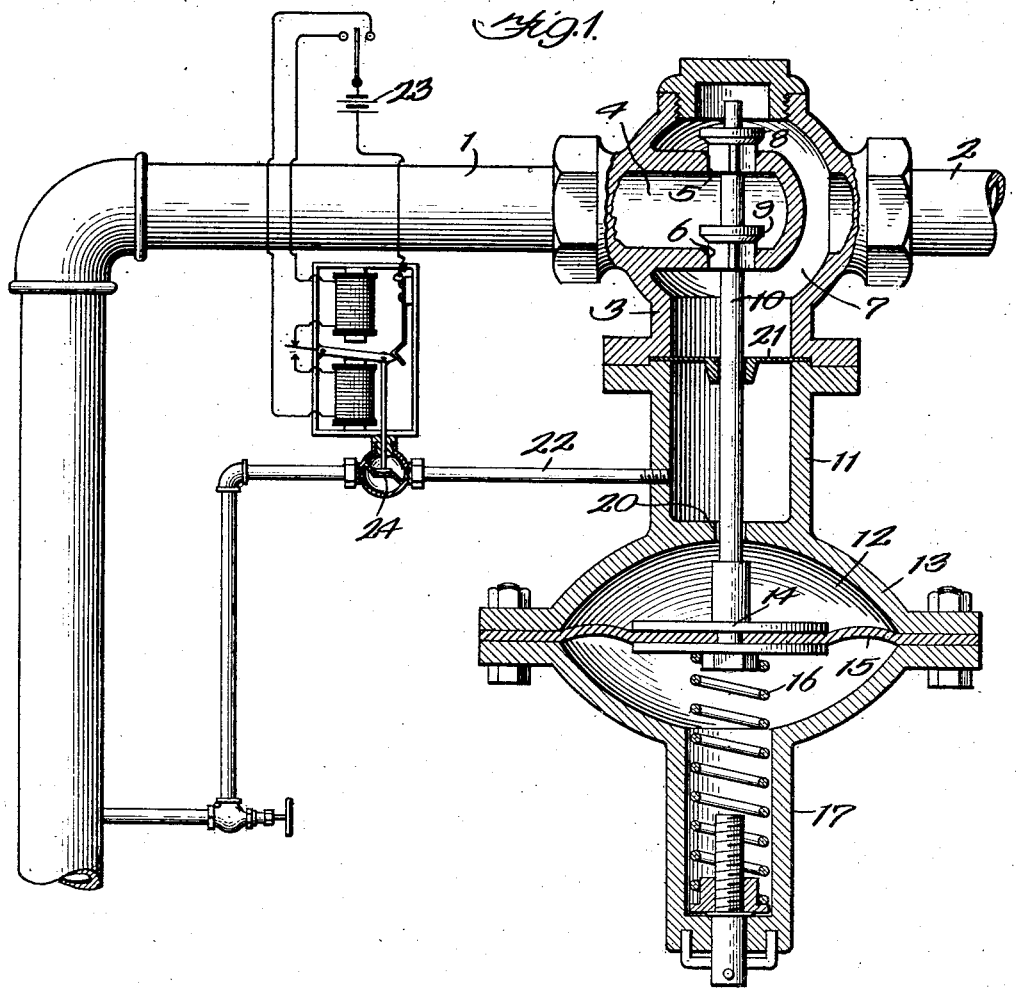
Figure 2:
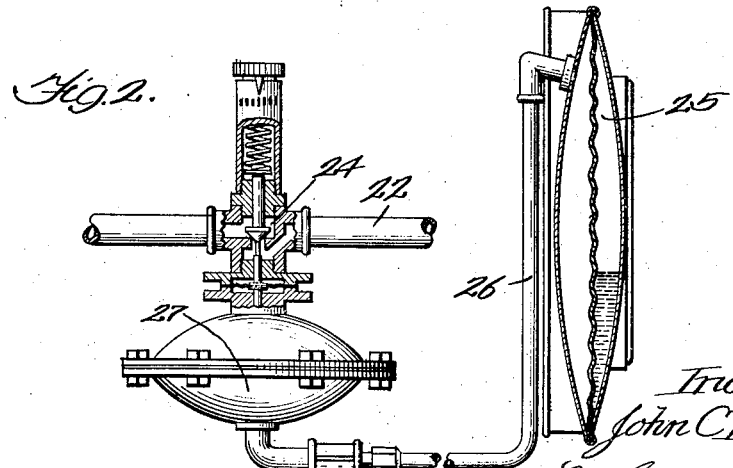

I will explain my invention more fully by reference to the accompanying drawing showing mechanism of my invention in longitudinal section as embodied in a valve structure, there being parts of the drawing that are diagrammatic, Figure 1 showing the preferred arrangement and Fig. 2 a modification of the temperature controlled valve of Fig. 1.

The apparatus illustrated will be described as it is used in a heating system. It includes many characteristics in common with the apparatus set forth in my Patent 1,091,660 dated March 31, 1914 as being also used in a heating system. The fluid, heating steam, whose passage is to be controlled or whose pressure is to be reduced, flows from a boiler or other source through the inlet pipe 1 and the valve mechanism of my invention, later to be fully described, to the outlet pipe 2 which forms a part of the heating system to which the steam is to be supplied at reduced or predetermined pressure. The pipes 1 and 2 are connected by the valve casing 3. This casing incloses and partially defines an inlet chamber 4 which initially receives the steam, at unreduced pressure, from the inlet pipe 1. Equal ports 5 and 6 are located in opposite walls of said inlet chamber and lead to the outlet and control chamber 7 communicating with the outlet pipe 2. Operatively equal valves 8 and 9 are respectively provided for said ports, valve 8 being within the outlet and control chamber 7 and valve 9 within the inlet chamber 4, whereby these valves 8 and 9 are substantially balanced. These valves are located upon a common stem 10 passing through said ports and through the lower cylindrical portion 11 of the valve chamber 7 into the upper portion 12 of the space inclosed by the continuation or enlargement 13 of the casing 3. Said valve stem is connected at 14 with the upper side of the diaphragm 15 that is held by and within the casing 13. A spring 16 has one end in engagement with the under side of the diaphragm. This spring is housed by a depending tubular continuation 17 of the casing 13. The spring is held and made adjustable to vary its degree of compression preferably by the arrangement disclosed in my Patent 1,100,077 of June 16, 1914.

Valve mechanism having the parts thus far specifically designated by numerals of reference in connection with the accompanying drawing is set forth in my aforesaid patent. There is desirably added to this structure a partition 21 having a central opening through which the valve stem passes and which is large enough to afford a restricted passage for steam through said partition. The space 12 is virtually a continuation of the space of the outlet chamber 7 to enable the diaphragm 15 to be subject to the downward pressure of the outgoing steam that is within said chamber, this pressure acting in opposition to the upward pressure of the spring 16. The spring 16 may be adjusted to resist any downward pressure of the steam within the outlet chamber 7 that is below a predetermined value say one pound. When such steam pressure is exceeded it will overcome the upward pressure of the spring to depress the diaphragm 15 and simultaneously close or partially close the balanced valves 8 and 9. Flow of steam from the inlet chamber 4 to the outlet chamber 7 through the ports 5 and 6 is thereupon cut off or reduced until the pressure of steam within the outlet chamber is sufficiently lessened to be overcome by the upward pressure of the spring 16 that thereupon lifts the diaphragm 15 and the valve stem 10 simultaneously to open or further open the balanced valves 8 and 9, whereupon flow of steam from the inlet chamber 4 and pipe 1 to the outlet chamber 7 and pipe 2 is resumed or increased. In this way the pressure of steam or other fluid may be maintained at a constant value in the discharge or outlet pipe 2 so long as there is exceeding pressure within the inlet pipe 1, it being immaterial whether or not such exceeding pressure fluctuates.

Means are shown in my aforesaid patent for disturbing the balance between the upward pressure of the spring 16 and the downward pressure of the outgoing steam in the outlet chamber 7—11—12, this means being operable by the temperature when reaching a predetermined maximum. The means disclosed in said patent includes a container for fluid, other than steam, which is subject to the temperature, and mechanism acting downwardly upon the stem of the balanced valve. By this arrangement the downward pressure of steam in the outlet chamber is supplemented sufficiently to depress the balanced valves against the pressure of the opposing spring, to cut off the flow of steam from the inlet to the outlet chamber. This prior arrangement requires the employment of a fluid distinct from the incoming steam, a shunted part of which latter I employ as thereby the presence of operative pressure is assured. The shunted portion of steam flows, when it is to function, through the pipe or passage 22 that is connected at one end with the inlet pipe 1 (of which the chamber 4 is virtually a continuation) and at its other end with the control chamber 7, preferably below the partition 21 which sufficiently restricts the upward flow of the shunted steam to make this steam effective, in conjunction with the pressure of the outgoing steam in the said chamber, to depress spring 16 to occasion a closing action of the balanced valves 8 and 9. The flow of the shunted steam is desirably automatically controlled by temperature controlled means, but I do not desire my invention to be thus limited. This means may be in the nature of a thermostat 23 located in the place whose temperature is to be controlled. When the temperature reaches a predetermined maximum this thermostat will be operated to open the electrically operated valve 24 located in the steam shunting pipe 22. Such valves are well known, and the one illustrated will not, therefore, be specifically described, and while I desirably employ a simple electric circuit between the valve 24 and the locality whose temperature is to be controlled, it is obvious that other means may be employed without departing from the spirit of my invention. For example, in Fig. 2 I have illustrated a well known pneumatic thermostat 25 which controls the flow of valve actuating fluid in the pipe 26 which communicates with the pneumatic chamber 27 of pneumatic mechanism that is in operating relation to the valve 24.

As illustrated, I dispense with fluid controlled mechanism at and extraneous to the temperature and pressure controlled valve mechanism, but I do not wish to be limited to this arrangement as I believe it to be new with me to employ in any manner a portion of the incoming steam or fluid in regulating the passage of the fluid flowing to any locality.

I do not wish to be limited to the use of my invention in connection with the passage of fluid whose inlet pressure exceeds its outlet pressure.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with communicating fluid conducting inlet and control chambers having inlet and outlet pipes respectively communicating therewith; of a balanced valve structure governing the communication between said chambers, an actuating element for imparting closing movement to the balanced valve structure and operated by pressure of fluid delivered to the control chamber, and temperature controlled means for effecting delivery of additional incoming fluid into the control chamber independent of the inlet chamber and between the outlet pipe and the actuating element of the valve structure.

2. The combination with communicating fluid conducting inlet and control chambers having inlet and outlet pipes respectively communicating therewith; of a balanced valve structure governing the communication between said chambers, an actuating element for imparting closing movement to the balanced valve structure and operated by pressure of the fluid delivered to the control chamber, a supplemental inlet pipe communicating directly with the control chamber between the outlet pipe and actuating element of the valve structure, and a temperature controlled valve for permitting and stopping the flow of fluid from said supplemental inlet pipe into the control chamber.

3. The combination with communicating fluid conducting inlet and control chambers having inlet and outlet pipes respectively communicating therewith; of a balanced valve structure governing the communication between said chambers, an actuating element for imparting closing movement to the balanced valve structure and operated by pressure of fluid delivered to the control chamber, a fluid throttling device disposed within the control chamber between the outlet pipe and the actuating element, a supplemental inlet pipe communicating directly with the control chamber between the throttling device and the actuating element of the valve structure, and a temperature controlled valve for permitting and stopping the delivery of fluid to the control chamber from said supplemental inlet pipe.

In witness whereof, I hereunto subscribe my name this 28th day of September, A. D. 1918.

JOHN C. HORNUNG.